US012598435B2

(12) United States Patent
Ramasamy et al.

(10) Patent No.: US 12,598,435 B2
(45) Date of Patent: Apr. 7, 2026

(54) INTERACTIVE ACCESSIBILITY DEVICE AND METHOD

(71) Applicant: THE BOEING COMPANY, Arlington, VA (US)

(72) Inventors: Karthikeyan Sankarankovil Ramasamy, Chennai (IN); Janaki Raman Jayaraman, Chennai (IN); Kishore Gopalakrishnan, Chennai (IN); Dilip Gobikrishnan, Chennai (IN)

(73) Assignee: THE BOEING COMPANY, Arlington, VA (US)

( * ) Notice: Subject to any disclaimer, the term of this patent is extended or adjusted under 35 U.S.C. 154(b) by 296 days.

(21) Appl. No.: 18/470,965

(22) Filed: Sep. 20, 2023

(65) Prior Publication Data

US 2025/0097650 A1 Mar. 20, 2025

(51) Int. Cl.
*H04R 25/00* (2006.01)

(52) U.S. Cl.
CPC .................................. *H04R 25/554* (2013.01)

(58) Field of Classification Search
CPC ..... G01C 21/20; G01C 21/3629; G06F 3/167; H04R 25/554; H04R 1/1016; H04R 1/1041; H04R 1/105; H04R 27/00; H04R 2205/041; H04R 2225/0216; H04R 2460/07
See application file for complete search history.

(56) References Cited

U.S. PATENT DOCUMENTS

| | | | | |
|---|---|---|---|---|
| 8,594,935 B2 * | 11/2013 | Cioffi | G01C 21/3629 701/533 |
| 8,718,930 B2 * | 5/2014 | Tachibana | H04S 7/304 381/26 |
| 12,264,931 B1 * | 4/2025 | Shigeoka | G06V 20/10 |
| 2007/0265890 A1 | 11/2007 | Curtis | |

OTHER PUBLICATIONS

"Air Travel Consumer Report: September Consumer Complaints Down 15.6% from August, Yet Remain Three Times Higher than Pre-Pandemic Levels," U.S Department of Transportation, Dec. 2, 2022, https://www.transportation.gov/briefing-room/air-travel-consumer-report-september-consumer-complaints-down-156-august-yet-remain, pp. 1-5.

* cited by examiner

*Primary Examiner* — Brian Ensey
(74) *Attorney, Agent, or Firm* — Moore IP Law

(57) ABSTRACT

An over-ear wearable device includes a housing with a first portion configured to be worn behind an ear of a user and a second portion configured to extend over the ear to position an output near an ear canal of the user. A memory is disposed within the housing and stores map data for an airport. A navigation sensor is disposed within the housing and configured to generate location data. A multi-button user input interface is coupled to the first portion. A processor is disposed within the housing and configured to responsive to selection of a first button of the multi-button user input interface, iterate through a list of destinations identified in the map data, responsive to selection of a second button of the multi-button user input interface, designate a target destination, and generate verbal navigation instructions based on the location data, the map data, and the target destination.

20 Claims, 7 Drawing Sheets

600

INTERACTIVE ACCESSIBILITY DEVICE AND METHOD

FIELD OF THE DISCLOSURE

The present disclosure is generally related to an accessibility device and method.

BACKGROUND

Among the challenges faced by the visually impaired is the difficulty of traveling and navigating to an intended destination, which can be difficult even in familiar settings. Within a building or neighborhood that a visually impaired person routinely navigates, a white cane or other tactile sensory tool may be adequate for testing a familiar path for unexpected obstacles. However, when traveling to a new, unfamiliar, or congested area, a visually impaired person may desire more sophisticated navigational aids in order to have a sense of freedom of movement without the fear of becoming lost or requiring the aid of another person. While a white cane will help them to avoid obstacles in their path and sense the quality of the terrain, it will not help them reorient themselves if they have an incomplete or inaccurate spatial sense of the surroundings. Furthermore, the need for aid from another person may require the visually impaired person to add additional time to their trip because they will need to wait for the other person. In addition, the visually impaired person will lose their sense of independence having to use the aid of another person to help guide them to their intended destination. Accordingly, there is a need for a device that helps guide a visually impaired person without the need for aid from another person.

SUMMARY

In a particular implementation, a system includes an over-ear wearable device. The over-ear wearable device may include a housing. The housing may include a first portion configured to be worn behind an ear of a user and a second portion configured to extend over the ear to position an output near an ear canal of the user. The over-ear wearable device may also include a memory disposed within the housing, where the memory stores map data for an airport. The over-ear wearable device may include one or more navigation sensors disposed within the housing, wherein the one or more navigation sensors are configured to generate location data based on global positioning system signals, local positioning system signals, or a combination thereof. A multi-button user input interface may couple to the first portion of the housing of the over-ear wearable device. The over-ear wearable device may include one or more processors disposed within the housing. The one or more processors may be coupled to the memory and the one or more navigation sensors. The one or more processors may be configured to: responsive to selection of a first button of the multi-button user input interface, iterate through a list of destinations identified in the map data, responsive to selection of a second button of the multi-button user input interface, designate a target destination from the list of destinations, and generate verbal navigation instructions based on the location data, the map data, and the target destination.

In another particular implementation, a method may include receiving, via a first button of a multi-button user input interface of an over-ear wearable device, a first selection to iterate through a list of destinations identified in map data. The method may also include receiving, via a second button of the multi-button user input interface, a second selection to designate a target destination from the list of destinations. The method may further include determining location data indicative of a location of the over-ear wearable device. The method may also include generating verbal navigation instructions based on the location data, the map data, and the target destination.

In another particular implementation, a method may include retrieving an over-ear wearable device from a container located proximate to an entrance of an airport. The method may include placing the over-ear wearable device onto an ear of a user, wherein a first portion of the over-ear wearable device is worn behind the ear of the user and a second portion of the over-ear wearable device is worn over the ear to position a speaker near an ear canal of the user. The method may also include selecting a first button of a multi-button user input interface to iterate through a list of selectable languages. The method may include selecting a second button of the multi-button user input interface to designate a language to be used. The method may further include selecting the first button of the multi-button user input interface to iterate through a list of destinations identified in map data. The method may include selecting the second button of the multi-button user input interface to designate a target destination from the list of destinations. The method may also include receiving, via an output from the speaker, verbal navigation instructions based on location data, the map data, and the target destination.

The features, functions, and advantages described herein can be achieved independently in various implementations or may be combined in yet other implementations, further details of which can be found with reference to the following description and drawings.

DETAILED DESCRIPTION

Figure 1:
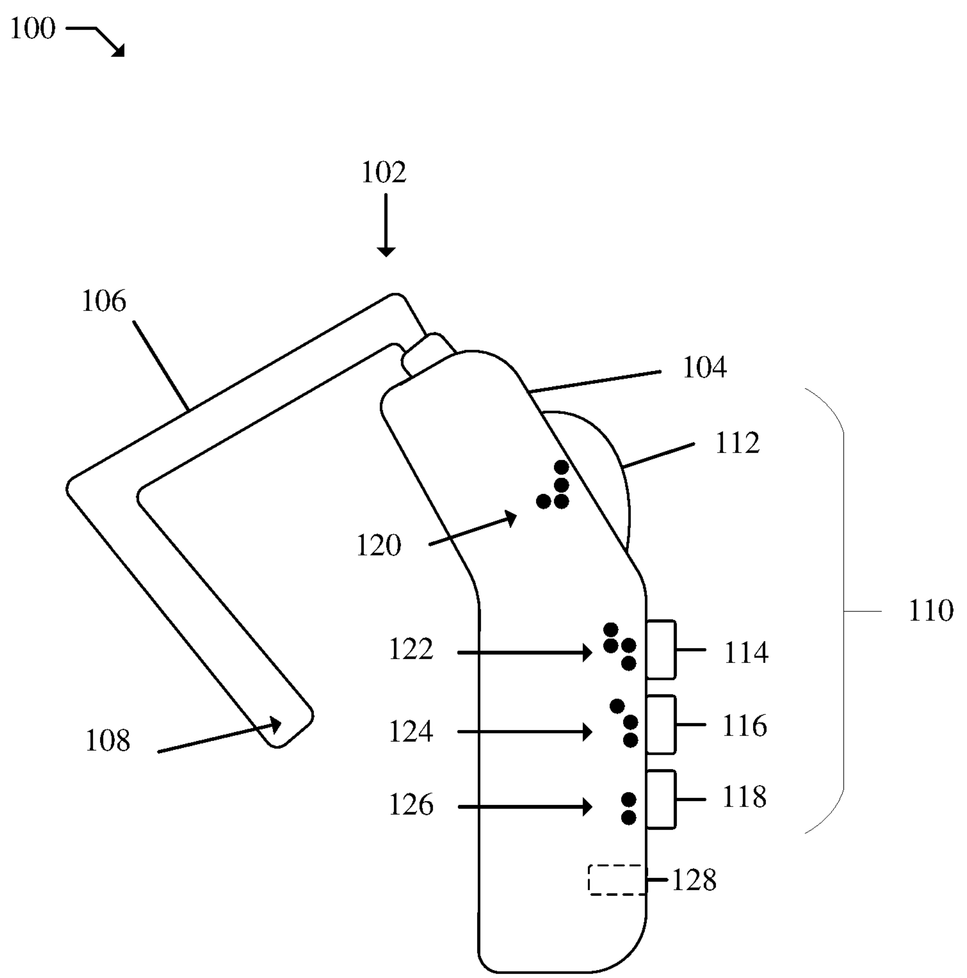
FIG. 1 is a diagram that illustrates a particular implementation of an over-ear wearable device.

Aspects disclosed herein present systems, apparatus, and methods for an interactive accessibility device.

People with visual impairments often have to rely on the assistance of sighted guides in airports, which prevents them from having an independent travel experience. In the past, such people had to rely on other people, guide dogs, and canes for help in navigating environments. People helpers are rarely available, and guide dogs and canes provide only a limited amount of information to the blind person. Dogs can help guide a person around obstacles, or along a pre-trained route. Canes provide information on the location of physical obstacles within immediate reach, but do not provide any information on the identity of such obstacles, or how to navigate around them.

A common problem encountered by the visually impaired person is understanding a new and unfamiliar environment, as for example when entering a room or space for the first time. A conventional approach for the visually impaired person is to explore the walkable space with a cane and use tactile feedback to identify objects. This is very time consuming, cumbersome, and potentially hazardous as the person can trip, bump into unexpected objects, touch dangerous surfaces such as a hot coffee maker or stove, etc. What is needed is a system, device and/or method for allowing the visually impaired person to navigate a space to a desired location with sufficient accuracy.

Described in this disclosure are techniques and systems for an over-ear wearable device. The over-ear wearable device may be configured to be worn by a visually impaired person. The over-ear wearable device provides verbal instructions to the visually impaired person which enables them to move independently between destinations within an airport, such as from an entry gate of the airport to the passenger boarding point in the airport without the need of assistance from another person, such as an employee of the airport.

In particular implementations, the over-ear wearable device includes a set of buttons to enable the visually impaired person to control various features of the over-ear wearable device. As an example, the buttons can include a volume button to adjust the volume of the verbal instructions and other output of the over-ear wearable device. As another example, the buttons can include a toggle button that is selectable to cause the over-ear wearable device to provide a list of destinations from which the visually impaired person can select a target destination. To illustrate, the list of destinations may include check in counter, security check, airport lounge, nearest washroom, and the like.

The buttons can also include a select button that enables the visually impaired person to select a particular destination in order to receive verbal instructions associated with the particular destination. The buttons can also include a back button that enables the visually impaired person to set the over-ear wearable device back to its original mode of providing instructions to the check in counter or boarding instructions.

The over-ear wearable device includes a built-in navigation system, such as a GPS navigation system and compass, so that the over-ear wearable device can determine its location and which direction the visually impaired person is moving.

The over-ear wearable device can be configured to provide verbal instructions in various selectable languages to enable local language support for the visually impaired person.

By using the techniques and systems described herein, the visually impaired person has a better experience as they have the ability to move independently. For example, the visually impaired person arriving at the airport may be able to check-in, go through security, and traverse the airport to arrive at their gate without the need of an airport employee. By not having to rely on the airport employee, the visually impaired person may arrive at the airport at the desired time they prefer, rather than having to arrive early to factor in some amount of time they may have to wait for the airport employee. In addition, by using the techniques and systems described herein, the visually impaired person is able to receive dedicated navigation instructions through the use of the over-ear wearable device. For example, the visually impaired person upon arriving at the airport may receive dedicated navigation instructions to a particular restaurant located within the airport.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 3:
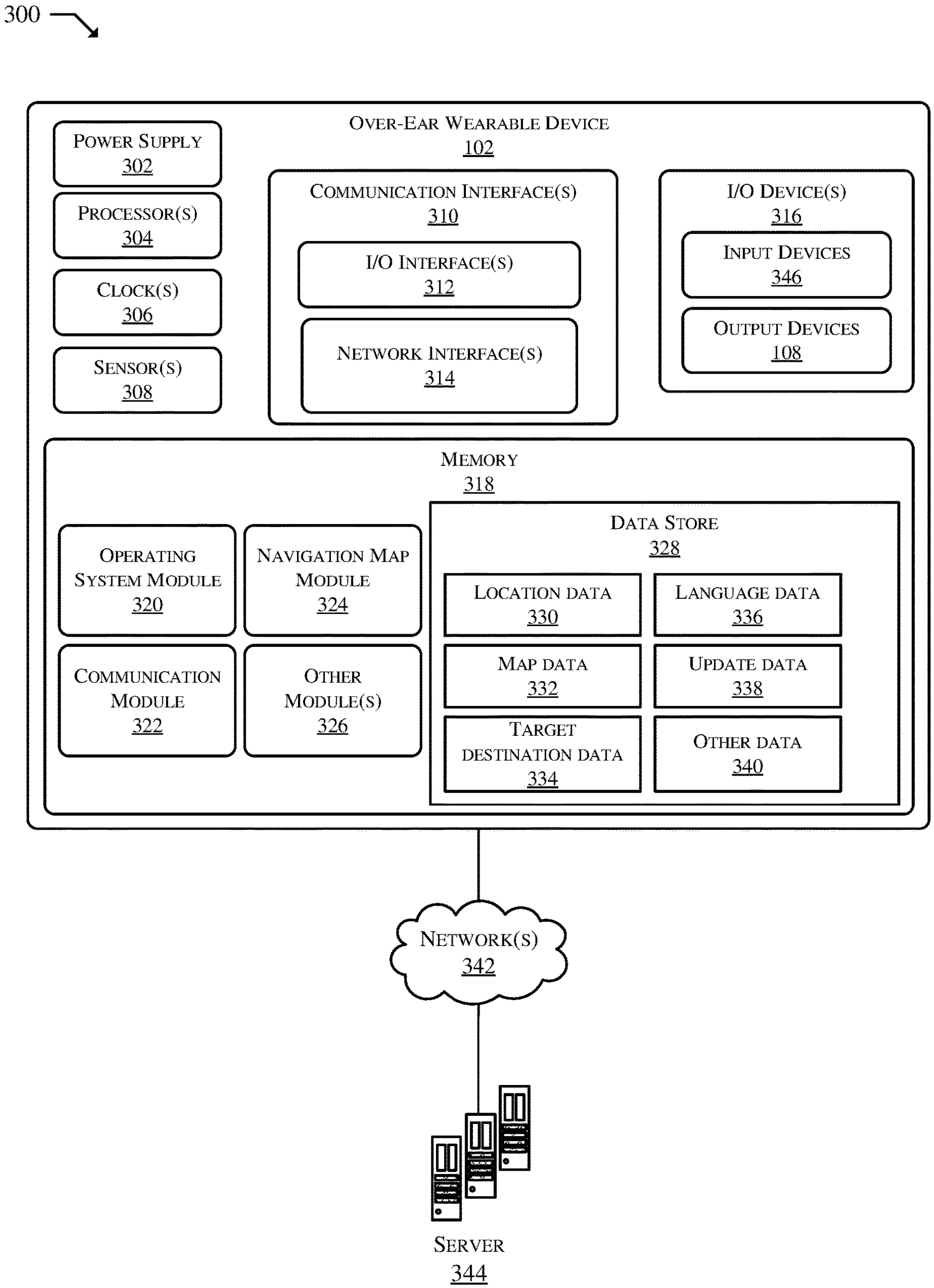
FIG. 3 is a diagram of electronic components of an over-ear wearable device.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 3 depicts a system 300 including one or more processors ("processor(s)" 304 in FIG. 3), which indicates that in some implementations the system 300 includes a single processor device 304 and in other implementations the system 300 includes multiple processors 304. For ease of reference herein, such features are generally introduced as "one or more" features and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a system 100 that includes an over-ear wearable device 102. In the example illustrated in FIG. 1, the over-ear wearable device 102 includes a housing that includes a first portion 104 and a second portion 106. The first portion 104 is configured to be worn behind an ear of a user. The second portion 106 is configured to extend over the ear of the user to position an output device 108 near an ear canal of the user. The output device 108 can include, for example, a speaker configured to provide a verbal output of instructions and/or notifications. In some implementations, a removeable cover is configured to encase the first portion 104, the second portion 106, or both. In such implementations, the removeable cover can include an opening to accommodate the second portion 106. The removeable cover may be made of silicon, plastic, leather, or other suitable materials.

In the example illustrated in FIG. 1, the first portion 104 includes a multi-button user input interface 110. In the example, illustrated in FIG. 1, the multi-button user input interface 110 includes a first button 112, a second button 114, a third button 116, and a fourth button 118. The first button 112 may be a volume button that is configured to enable the user to adjust the volume of the output device 108. The direction the first button 112 is pressed can either increase or decrease the volume. For example, when the user presses the button upward (i.e., toward the second portion 106) the volume is increased and when the user presses the button downward (i.e., away from the second portion 106) the volume is decreased. The second button 114 may be a toggle button. The selection of the second button 114 may iterate through a list of languages for the user to select. For example, in response to selection of the second button 114, the over-ear wearable device 102 may be configured to iterate though a list of languages, such as English, Spanish, French, German, and so forth. In some implementations, selection of the second button 114 may iterate through a list of destinations. For example, the list of destinations may include check-in kiosk, security check, airport lounge, terminal or gate associated with a flight, restaurants, washroom, lift facility, service desk, convenience store, and so forth.

In some implementations, individual tactile indicia are associated with and located proximate to each button 112, 114, 116, and 118 of the multi-button user input interface 110. The tactile indicia can include raised dots that represent letters of the alphabet or provide information about the particular multi-button user input interface 110 (e.g., letters or words in Braille or another tactile writing system identifying the functions of the buttons 110). For example, first indicia 120 can indicate a volume button and is located proximate to the first button 112. Second indicia 122 can indicate a toggle button and is located proximate to the second button 114. Third indicia 124 can indicate a selection button and is located proximate to the third button 116. Fourth indicia 126 can indicate a back button and is located proximate to the fourth button 118.

As illustrated in FIG. 1, the over-ear wearable device 102 can include a charging port 128. In FIG. 1, the charging port 128 is configured to receive a cable to recharge its onboard power supply. In other examples, the charging port can receive power via a different mechanism, such as wirelessly by inductive coupling.

The over-ear wearable device 102 can include a memory that is disposed within the housing. The memory is configured to store at least map data for an airport, destination data, language data, navigation data, update data, and/or other data.

In some implementations, the over-ear wearable device 102 can include one or more navigation sensors disposed within the housing. The one or more navigation sensors are configured to generate location data based on global positioning system signals, local positioning system signals, or a combination thereof. Global positioning system signals are generated by a global positioning system. The local and satellite signals are generated by a differential global positioning system that may supplement and/or enhance the global positioning system signals.

The over-ear wearable device 102 can include one or more processors disposed within the housing. The one or more processors can be coupled to the memory and the one or more navigation sensors. The one or more processors are configured to execute one or more instructions. For example, the one or more processors are configured to iterate through a list of options, in response to the over-ear wearable device 102 receiving a selection of the second button 114. The list of options can include an option to hear a list of languages the user can select, an option to hear a list of destinations identified in the map data, and so forth. In this example, the over-ear wearable device 102 iterates through a list of languages in response to the selection of the third button 116. The over-ear wearable device 102 continues to iterate through the list of languages until the user selects the third button 116. The selection of the third button 116 designates a language to be used while the user is using the over-ear wearable device 102. For example, the user can listen to verbal instructions, via the output device 108, indicating the languages the user can select. The user upon hearing the language they would prefer to use can select that particular language.

Continuing the above example, the user can select again the second button 114 and in response to the selection, the over-ear wearable device 102 can iterate through the list of destinations identified in the map data. The list of destinations can include check in counter, security check, airport lounge, a gate or terminal associated with travel information associated with the user, one or more restaurants, one or more washrooms, convenience store, lift station, other airport locations, or a combination thereof. The over-ear wearable device 102 continues to iterate through the list of destinations until the user selects the third button 116. In response to the selection of the third button 116, the over-ear wearable device 102 designates a target destination from the list of destinations. For example, the user can select as the target destination the airport lounge. The over-ear wearable device 102 generates verbal navigation instructions based on the location data indicative of the location of the over-ear wearable device 102, the map data associated with the airport, and the target destination.

The over-ear wearable device 102 can provide, using the output device 108 near the ear canal of the user, the verbal navigation instructions. For example, the verbal navigation instructions can include verbal instructions such as walk forward, turn left, turn right, stop, and so forth. The verbal navigation instructions can also include a distance to the next waypoint or other navigation milestone. For example, the verbal navigation instructions can indicate that the user has to walk forward 20 feet and then turn left. The verbal navigation instructions can also include distance updates while the user is moving. Continuing the above example, the verbal navigation instructions can indicate that the user has 15 feet, 10 feet, 5 feet, and so forth remaining before reaching the next waypoint or navigation milestone (e.g., until a turn or until reaching their target destination). In another example, the verbal navigation instructions can indicate that the user has to walk 30 steps and then turn left. The verbal navigation instructions can also include a number of steps update while the user is moving. Continuing the above example, the verbal navigation instructions can indicate that the user has 20 steps, 15 steps, 10 steps, and so forth remaining before reaching the next waypoint or navigation milestone (e.g., until a turn or until reaching their target destination).

In some implementations, the verbal navigation instructions include notifications of other destinations they are passing while traversing to their target destination. For example, the verbal navigation instructions can indicate that the user is passing a particular store or washroom while traversing to the airport lounge. In other implementations, the verbal navigation instructions include correction instructions when the over-ear wearable device 102 has determined that the user is off course, lost, or going in the wrong direction. For example, the correction instructions can indicate to the user that they went too far and missed their turn. The correction instructions can then provide instructions to get the user back in the correct direction. For example, the correction instructions may indicate for the user to turn around (180 degrees) and walk 5 feet.

The over-ear wearable device 102 can determine when it has reached the target destination. For example, the over-ear wearable device 102 can determine that it is at the airport lounge, which is the target destination that the user had selected. The over-ear wearable device 102, in response to the determination, provide, using the output device 108, instructions that the user has reached the target destination. For example, the over-ear wearable device 102 can provide verbal instructions or an audio sound indicating to the user that they have reached the airport lounge.

The over-ear wearable device 102 can receive a selection of the second button 114 or the fourth button 118 and responsive to that selection reiterate through the list of destinations. For example, while the user to traversing to the airport lounge, the over-ear wearable device 102 may receive a selection of the fourth button 118. In response to that selection the over-ear wearable device 102 provides the list of destinations that includes the check in counter, security check, airport lounge, a gate or terminal associated with travel information associated with the user, one or more restaurants, one or more washrooms, convenience store, lift station, or a combination thereof. Continuing the above example, the over-ear wearable device 102 can receive a selection of the third button 116 designating a second target destination, such as the washroom. The over-ear wearable device 102 can generate updated verbal navigation instructions based on second location data, the map data, and the second target destination. The over-ear wearable device 102 can provide the updated verbal navigation instructions to the user, via the output device 108.

The over-ear wearable device 102 can include a network interface. The network interface is configured to enable communications between the over-ear wearable device 102 and other network accessible devices. For example, the over-ear wearable device 102 can communicate with a service to receive data indicative of updated map data for the airport, data indicative of a change to flight information, or data indicative of information associated with the airport. The over-ear wearable device 102 generates, in response to the received data, informational announcements indicative of an update to the map data for the airport, a change to the flight information, or the information associated with the airport. The over-ear wearable device 102 then provided, using the output device 108, the informational announcement. For example, the over-ear wearable device 102 can provide informational announcement that flight number ABC123 is now departing from gate A1. In other examples, the informational announcement can indicate that a personal belonging was left at gate B1, or that the map data has been updated and provide a request of whether the user would like to have new verbal navigation instructions generated. Upon the completion of the informational announcement, the over-ear wearable device 102 can receive a selection of the third button 116 to resume the verbal navigation instructions associated with the target destination. In some implementations, the verbal navigation instruction may resume once the informational announcement has been completed. For example, the verbal navigation instructions associated with the target destination of the airport lounge resumes once the informational announcement of a personal belonging being left at gate B1 is completed. In other implementations, upon completion of the informational announcement, the over-ear wearable device 102 can receive a selection of the third button 116. The selection of the third button 116 can cause the over-ear wearable device 102 to generate updated verbal navigation instruction based on the provided informational announcement. For example, the informational announcement indicated that a personal belonging was left at the security check. The user upon hearing this informational announcement determines that the personal belonging is theirs and needs to return to the security check. The user then can select the third button 116, which causes the over-ear wearable device 102 to generate updated verbal navigation instructions to guide the user back to the security check.

By using the techniques and systems described herein, the user has a better experience, as they can move about the airport independently with dedicated navigation instructions and do not need to rely on aid from airport employees. In addition, airports may be able to decrease the number of required employees as the user may not need as much aid as previously required to maneuver about the airport.

Although FIG. 1 illustrates a multi-button user input interface 110 that includes four buttons 112, 114, 116, and 118, in other implementations, the multi-button user input interface 110 can include more or fewer buttons or can use other input mechanisms in addition to or instead of buttons. For example, the multi-button user input interface 110 can include three buttons 112, 114, and 116. In this example, the first button 112 is the volume button and is configured to adjust the volume of the output device 108. The second button 114 is the toggle button and is configured to provide a list of options that can include a list of languages, a list of destinations, or both. The third button 116 is the select button and is configured to enable the user to make a selection. In this implementation, when the user wants to hear a different list, the user selects the second button 114. In response to the selection, the over-ear wearable device

102 provides the previously presented list of options. For example, the over-ear wearable device 102 is providing, via the output device 108, the list of destinations to the user in Spanish. In this example, the user has decided they want to change the language, so the user selects the second button 114. The selection then causes the over-ear wearable device 102 to stop providing the list of destinations and instead provide the list of languages to the user.

In another implementation, the multi-button user input interface 110 can include switches rather than buttons. For example, a first switch can be used to adjust the volume of the output device 108. The direction the user pushes the first switch can either decrease or increase the volume. For example, when the user pushes the first switch to the left it would decrease the volume, while pushing the first switch to the right would increase the volume. A second switch can be used to initiate iteration through a list (e.g., the languages or destinations). The direction the user pushes the second switch can change which list is being presented. For example, when the user pushes the second switch to the left, the list of languages is provided, while pushing the second switch to the right, the list of destinations is provided. A third switch can be used to initiate a selection. For example, during the presentation of the list of destinations the user can push the third switch in either direction to select the airport lounge as the target destination.

Figure 2:
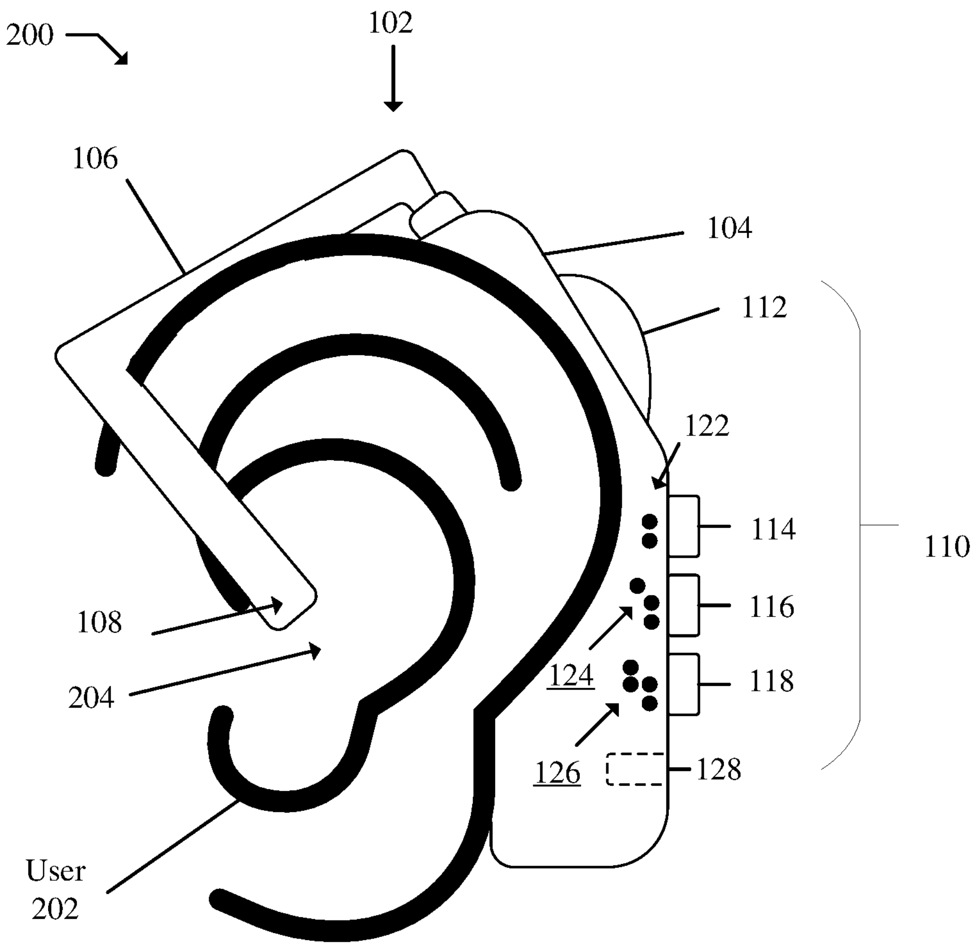
FIG. 2 is a diagram that illustrates a particular implementation of an over-ear wearable device.

FIG. 2 depicts an example of a system 200 that includes the over-ear wearable device 102. The over-ear wearable device 102 includes the housing. The housing includes the first portion 104 and the second portion 106. The first portion 104 is configured to be worn behind an ear of a user 202. The second portion 106 is configured to extend over the ear of the user 202 to position the output device 108 near an ear canal 204 of the user 202. The output device 108 includes a speaker configured to provide the verbal navigation instructions, informational announcement, notifications, or a combination thereof. A removeable cover is configured to encase the first portion 104, the second portion 106, or both. The removeable cover includes an opening to accommodate the second portion 106. The removeable cover may be made of silicon, plastic, leather, or other suitable materials.

The first portion includes the multi-button user input interface 110. The multi-button user input interface 110 includes the first button 112, the second button 114, the third button 116, the fourth button 118, and/or one or more other buttons. The first button 112 is a volume button that is configured to enable the user to adjust the volume of the output device 108. The second button 114 is a toggle button. The selection of the second button 114 causes the over-ear wearable device 102 to iterate through a list of options for the user to select. The list of options can include a list of languages, a list of destinations, and so forth. For example, the list of languages can include, English, Spanish, French, German, Hindi, Urdu, Bengali, Punjabi, and so forth. In another example, the list of destinations may include check-in kiosk, security check, airport lounge, terminal or gate associated with a flight the user may take, restaurants, washroom, lift facility, service desk, convenience store, and so forth.

In some implementations, individual tactile indicia are associated with and located proximate to each button 112, 114, 116, and 118 of the multi-button user input interface 110. The tactile indicia can include raised dots that represent letters of the alphabet or provide information about the particular multi-button user input interface 110 (e.g., letters or words in Braille or another tactile writing system identifying the functions of the buttons 110). For example, first indicia 120 can indicate a volume button and is located proximate to the first button 112. Second indicia 122 can indicate a toggle button and is located proximate to the second button 114. Third indicia 124 can indicate a selection button and is located proximate to the third button 116. Fourth indicia 126 can indicate a back button and is located proximate to the fourth button 118.

The over-ear wearable device 102 includes the charging port 128. The charging port 128 is configured to receive a cable to recharge its onboard power supply.

FIG. 3 is a diagram of a system 300 of components of the over-ear wearable device 102, according to some implementations.

In the example illustrated in FIG. 3, the over-ear wearable device 102 includes one or more power supplies 302 to provide electrical power to the components of the over-ear wearable device 102. The one or more power supplies 302 may include or correspond to batteries, capacitors, fuel cells, photovoltaic cells, wireless power receivers, conductive couplings suitable for attachment to an external power source such as provided by an electric utility, and so forth. For example, batteries of the one or more power supplies 302 on board the over-ear wearable device 102 may be charged wirelessly, such as through inductive or capacitive power transfer. In another implementation, electrical contacts may be used to recharge the batteries of the over-ear wearable device 102.

The over-ear wearable device 102 may include one or more processors 304 configured to execute one or more stored instructions. The processors 304 can include one or more cores. The processors 304 can include general purpose microprocessors, microcontrollers, application specific integrated circuits (ASICs), digital signal processors (DSPs), and so forth. One or more clocks 306 provide information indicative of date, time, ticks, and so forth to other components of the over-ear wearable device 102. For example, the processor 304 can use data from the clock 306 to associate a particular interaction with a particular point in time.

The over-ear wearable device 102 includes one or more sensors 308. The one or more sensors 308 are configured to generate location data 330 based on global positioning system signals, local positioning system signals, or a combination thereof. Global positioning system signals are generated by a global positioning system. The local signals are generated by a differential global positioning system that can supplement and/or enhance the global positioning system signals.

The over-ear wearable device 102 can include one or more communication interfaces 310 such as input/output (I/O) interfaces 312, network interfaces 314, and so forth. The communication interface 310 enables the over-ear wearable device 102, or components thereof, to communicate with other devices or components. For example, the communication interface 310 enables the over-ear wearable device 102 to receive data such as map data 332, language data 336, update data 338, other data 340, or a combination thereof. The map data 332 is indicative of a layout associated with an airport. The language data 336 is indicative of a list of languages that a user may select from as described in FIG. 1. The updated data is indicative of updated data for the airport, data indicative of a change to flight information, or data indicative of information associated with the airport. The other data 340 may include information such as help desk information or emergency contact information. The I/O interfaces 312 may include an Inter-Integrated Circuit (I2C) bus, a Serial Peripheral Interface (SPI) bus, Universal Serial Bus (USB) and so forth.

The I/O interface(s) 312 may couple to one or more I/O devices 316. The I/O devices 316 may include input devices 346. The input devices 346 can include the multi-button user input interface 110 as described above in FIGS. 1 and 2. The I/O devices 316 may also include the output device 108. The output device 108 may include a bone conduction speaker, an air conduction speaker, a haptic output device, and so forth.

The network interface 314 are configured to provide communications between the over-ear wearable device 102 and other devices, such as a server 344. The network interfaces 314 may include devices configured to couple to personal area networks (PANs), wired or wireless local area networks (LANs), wide area networks (WANs), and so forth. For example, the network interfaces 314 may include devices compatible with Ethernet, a Wi-Fi® communication protocol, a Bluetooth® communication protocol, a Bluetooth® Low Energy communication protocol, a ZigBee® communication protocol, and so forth. (Wi-Fi® is a registered trademark of the Wi-Fi Alliance Corporation of Santa Clara, California; Bluetooth® is a registered trademark of Bluetooth SIG of Kirkland, Washington; ZigBee® is a registered trademark of ZigBee Alliance Corporation (now known as Connectivity Standards Alliance) of Davis, California.)

The over-ear wearable device 102 can also include one or more busses or other internal communications hardware or software that allow for the transfer of data between the various modules and components of the over-ear wearable device 102.

As shown in FIG. 3, the over-ear wearable device 102 includes one or more memories 318. The memory 318 may include one or more non-transitory computer-readable storage media (CRSM). The CRSM can be any one or more of an electronic storage medium, a magnetic storage medium, an optical storage medium, a quantum storage medium, a mechanical computer storage medium, and so forth. The memory 318 provides storage of computer-readable instructions, data structures, program modules, and other data for the operation of the over-ear wearable device 102. A few examples of functional modules are shown stored in the memory 318, although the same functionality may alternatively be implemented in hardware, firmware, or as a system on a chip (SoC).

In some implementations, the memory 318 includes at least one operating system (OS) module 320. The OS module 320 is configured to manage hardware resource devices such as the I/O interfaces 312, the I/O devices 316, the communication interfaces 310, and provide various services to applications or modules executing on the processors 304. The OS module 320 may implement a variant of the "a FreeBSD® operating system" as promulgated by the FreeBSD Project; other "UNIX® or UNIX-like variants; a variation of the Linux®" operating system as promulgated by Linus Torvalds; "the Windows® operating system" from Microsoft Corporation of Redmond, Washington, USA; and so forth. (FreeBSD® is a registered trademark of FreeBSD Foundation of Boulder, Colorado; UNIX® is a registered mark of The Open Group of San Francisco, California; Linux® is a registered trademark of the Linux Foundation of San Francisco, California; Windows® is a registered trademark of Microsoft Corporation of Redmond, Washington.)

In some implementations, the memory 318 can be a data store 328 and one or more of the following modules. These modules may be executed as foreground applications, background tasks, daemons, and so forth. The data store 328 may use a flat file, database, linked list, tree, executable code, script, or other data structure to store information. In some implementations, the data store 328 or a portion of the data store 328 may be distributed across one or more other devices including servers 344, network attached storage devices, and so forth.

In some implementations, the over-ear wearable device 102 can receive and store data from a server based on a user selection. For example, the over-ear wearable device 102 can receive a selection that English be the preferred language and that the target destination be the airport lounge. In this implementation, the over-ear wearable device 102 can send data indicative of these selections to the server. The server upon receiving this data can generate the verbal navigation instructions in English. The server then can send data indicative of the verbal navigation instructions in English to the over-ear wearable device 102. The over-ear wearable device 102 can then provide the verbal navigation instructions to the user.

As illustrated in FIG. 3, the memory 318 stores a communication module 322 that is configured to use the communication interfaces 310 to establish communication with the other devices via one or more networks 342. For example, the network 342 may comprise a personal area network, local area network, metropolitan area network, wide area network, and so forth. The over-ear wearable device 102 uses the networks 342 to access one or more services that are provided by the other devices. For example, the over-ear wearable device 102 can establish communication with one or more of the computing devices, other over-ear wearable devices 102, one or more servers 344, the multi-button user input interface 110 the input devices 346, or other devices. The communications may be authenticated, encrypted, and so forth.

In one example, the memory stores a navigation map module 324. The navigation map module 324 generates the verbal navigation instructions based on the location data 330, the map data 332, and the target destination data 334. The location data 330, the map data 332 and the target destination data 334 can be stored in the data store 328.

Other modules 326 can also be present in the memory 318. For example, the other modules 326 may include a contact management module to contact a help desk to help the user with the operation of the over-ear wearable device 102 or contact an emergency service or airport employee to help aid the user.

Figure 4:
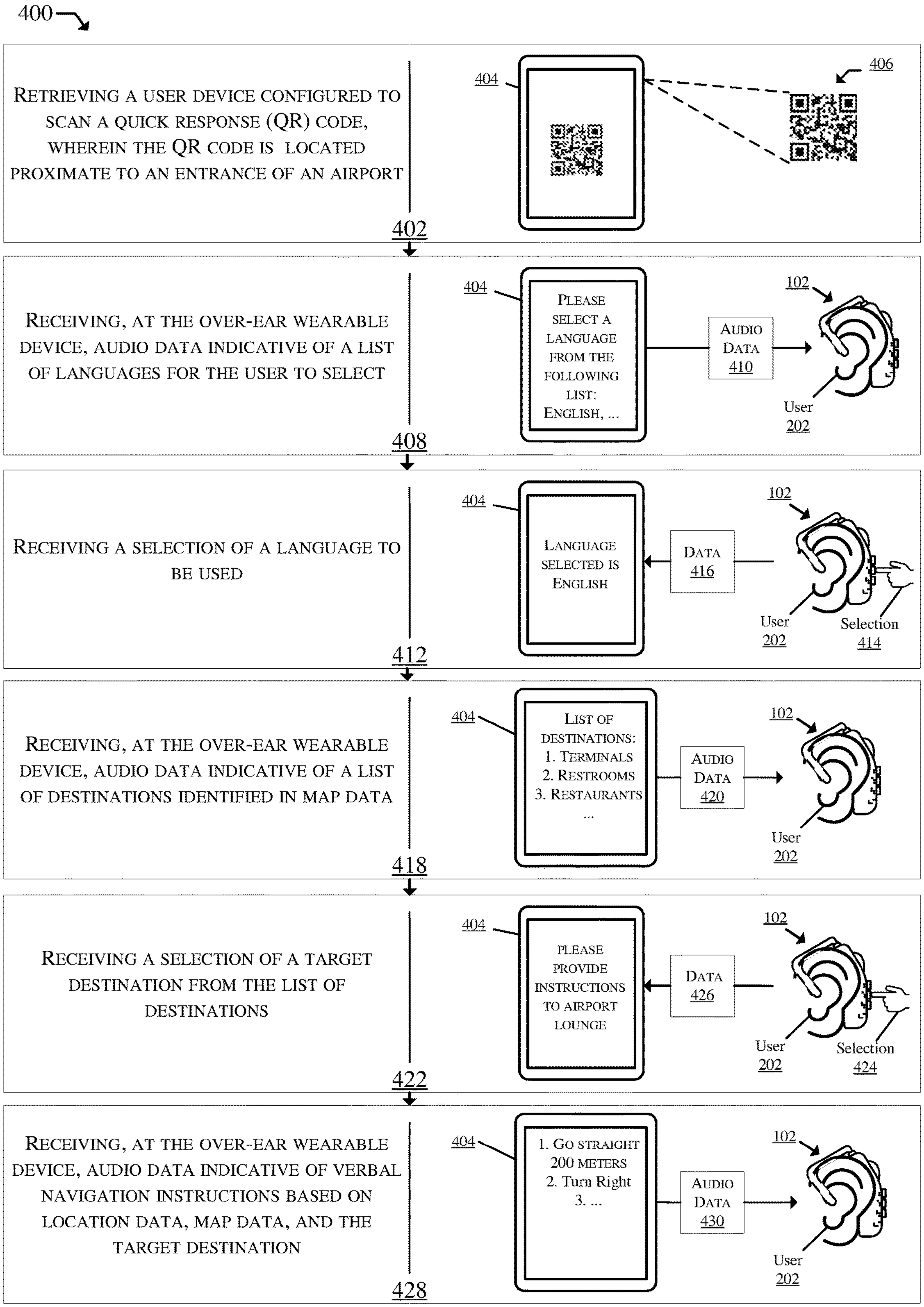
FIG. 4 is a flowchart and diagram that illustrates a particular method and implementation of an interactive accessibility application.

FIG. 4 is a diagram that illustrates a flow chart of an example of a method 400 for using an interactive wearable application with the over-ear wearable device 102 as described in FIG. 1. The method 400 includes, at block 402, retrieving a user device 404 configured to scan a quick response (QR) code 406. The QR code 406 may be located proximate to an entrance of an airport. For example, when a user arrives at an airport, they can retrieve their user device 404. The user device 404 may include a touchscreen, mouse, camera, or other input device as well as a display device to present a user interface. The user device 404 can include, correspond to, or be included within a television, a tablet computer, a personal computer, an electronic book reader, a gaming console, a set-top box, media player, an in-vehicle entertainment system, a smartphone, a server, a device control system, a voice activated device, and so forth. The user device 404 can utilize automated speech recognition or other techniques to receive and analyze audible user inputs. The user can access a camera application on the user device 404 and use the camera to scan the QR code 406. In one example, a container located proximate to the entrance of the airport, or a container located proximate to the check-in counter can include one or more of the over-ear wearable device 102 for the user to select from. Continuing this example, the user selects one of the over-ear wearable devices 102 and places it around their ear.

The method 400 includes, at block 408, receiving, at the over-ear wearable device 102, audio data 410 indicative of a list of languages for the user 202 to select. The over-ear wearable device 102 upon receiving the audio data 410 provides the list of languages to the user 202. In other implementations, the user can use the interactive wearable application to configure and/or control another device, such as headphones or earbuds. The user device 404 can also be configured to transcribe the audio data 410 and display it in written form on the user interface.

The method 400 includes, at block 412, receiving a selection 414 of a language to be used. For example, the over-ear wearable device 102 receives the selection 414 to select a particular language. The over-ear wearable device 102 sends data 416 indicative of the selection to the user device 404. The user device 404 upon receipt of the data 416 can configure that going forward the selected particular language is used.

In some implementations, the user utters that the language they would like to select is English. The user device 404 receives the utterance as audio data. The user device 404 is configured to analyze the audio data and determine that the user selected English as the preferred language. In other implementations, the user 202 can select a preferred language from the list of languages being displayed on the user device 404.

In another implementation, the user 202 is at an airport counter, such as a check-in counter or help desk. At the airport counter the user 202 requests to have the over-ear wearable device 102. An airport employee can retrieve the over-ear wearable device 102 and ask the user 202 which language they would prefer. The airport employee can then configure the over-ear wearable device 102 to the preferred language.

The method 400 includes, at block 418, receiving, at the over-ear wearable device 102, audio data 420 indicative of a list of destinations identified in map data. The user device 404 can also be configured to transcribe the audio data 420 and display it in written form on the user interface. The list of destinations identified in the map data may include check in counter, security check, airport lounge, nearest washroom, and the like.

The method 400 includes, at block 422, receiving a selection 424 of a target destination from the list of destinations. For example, the over-ear wearable device 102 receives the selection 424 to select a target destination, such as the airport lounge. The over-ear wearable device 102 sends data 426 indicative of the selection to the user device 404. The user device 404 upon receipt of the data 426 can generate verbal navigation instructions for the target destination.

In some implementations, the user can utter that the target destination is the airport lounge. The user device 404 receives the utterance as audio data. The user device 404 is configured to analyze the audio data and determine that the target destination is the airport lounge. The user device 404 can then generate verbal navigation instructions to guide the user to the airport lounge. In other implementations, the user 202 may select a target destination from the list of destinations being displayed on the user device 404.

In other implementations, the user 202 is at an airport counter, such as a check-in counter or help desk. An airport employee can ask the user 202 to select a target destination. The airport employee can then configure the over-ear wearable device 102 to include verbal navigation instructions to guide the user 202 to the target destination.

The method 400 includes, at block 428, receiving, at the over-ear wearable device 102, audio data 430 indicative of verbal navigation instructions based on location data, map data, and the target destination, as described in FIG. 1. The user device 404 can also be configured to transcribe the audio data 430 and display it in written form on the user interface.

Figure 5:
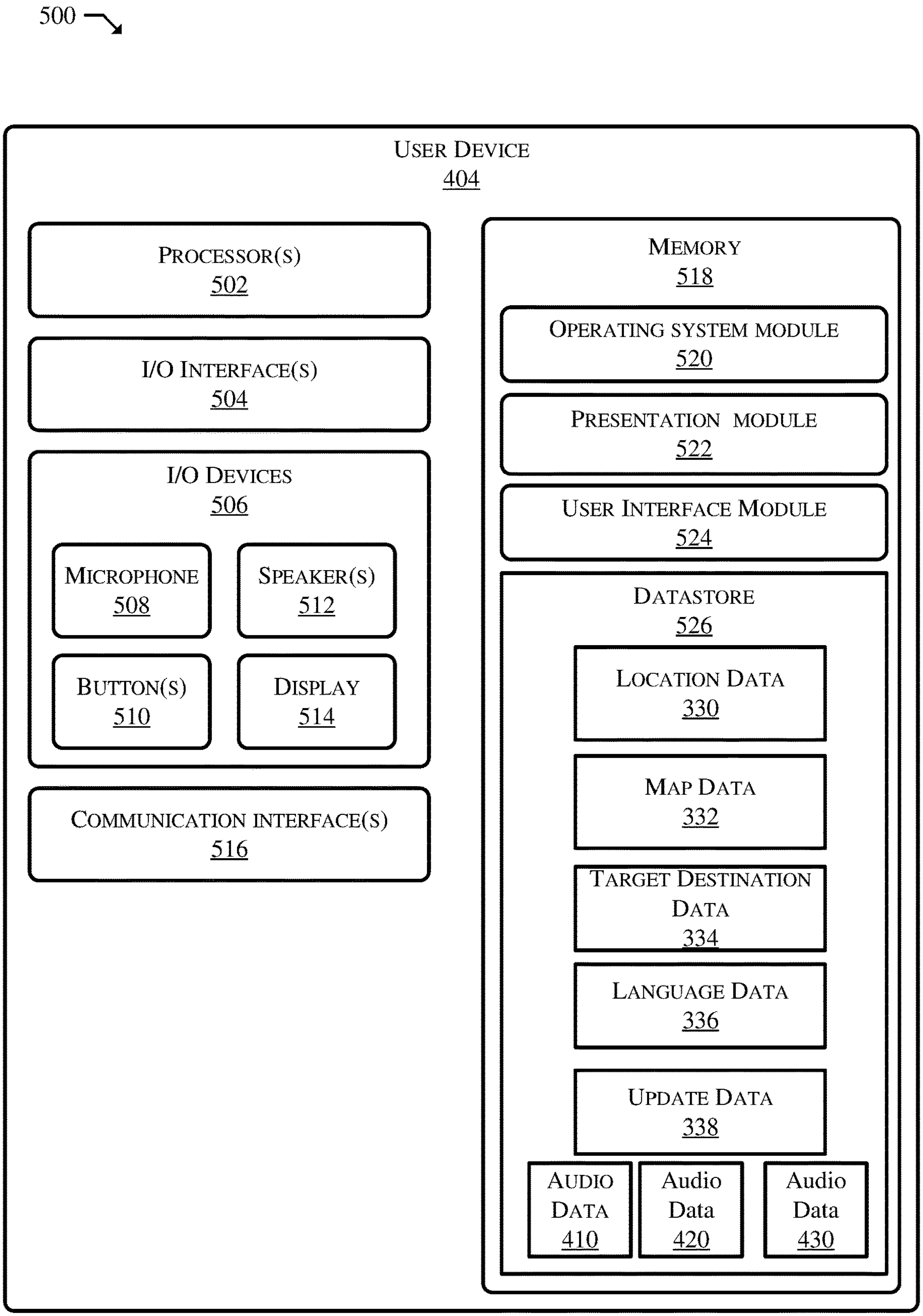
FIG. 5 is a diagram of electronic components of a user device.

FIG. 5 is a diagram 500 of electronic components of the user device 404. In the example illustrated in FIG. 5, the user device 404 can include one or more processors 502 configured to execute one or more stored instructions. The processor(s) 502 can include one or more cores and may also be referred to as hardware processors.

The user device 404 can include one or more input/output (I/O) interface(s) 504 to allow the processor(s) 502 or other components of the user device 404 to communicate with various other devices, other computing devices, one or more servers, other services, and so on. The I/O interfaces 504 can interfaces such as Inter-Integrated Circuit (I2C) bus, Serial Peripheral Interface bus (SPI), Universal Serial Bus (USB) as promulgated by the USB Implementers Forum, RS-232, and so forth.

In some implementations, the I/O interface(s) 504 are/is coupled to one or more I/O devices 506. The I/O devices 506 can include one or more input devices such as a keyboard, a mouse, a microphone 508, user input buttons 510, and so forth. The I/O devices 506 can also include output devices such as audio speakers 512, headphones, earbuds, one or more displays 514, and so forth. In some implementations, the I/O devices 506 are physically incorporated within the user device 404, or they are externally placed. The I/O devices 506 can include various other devices as well.

The user device 404 can also include one or more communication interfaces 516. The communication interface(s) 516 are configured to provide communications with other devices, web-based resources, the one or more servers, other services, routers, wireless access points, and so forth. The communication interface(s) 516 can include wireless functions, devices configured to couple to one or more networks including local area networks (LANs), wireless LANs, wide area networks (WANs), and so forth. The user device 404 can also include one or more busses or other internal communications hardware or software that allow for the transfer of data between the various modules and components of the user device 404.

In some implementations, the user device 404 includes one or more memories 518. The memory 518 includes one or more computer-readable storage media (CRSM). The memory 518 provides storage of computer readable instructions, which enables the user device 404, to present the user interface. The memory 518 can include at least one operating system (OS) module 520. Respective OS modules 520 are configured to manage hardware devices such as the I/O interface(s) 504, the I/O devices 506, the communication interface(s) 516, and provide various services to applications or modules executing on the processors 502.

Also, stored in the memory 518 can be one or more of the following modules. These modules can be executed as foreground applications, background tasks, daemons, and so forth. A presentation module 522 is configured to present the user interface. For example, the presentation module 522 can include a web browser, application, and so forth.

The memory 518 can also include a user interface module 524. The user interface module 524 is configured to generate user interface data indicative of a written form of the audio data 410, 420, and 430 as described in FIG. 4.

In the illustrated example of FIG. 5, the memory 518 includes a datastore 526 to store information. The datastore 526 can use a flat file, database, linked list, tree, executable code, or other data structure to store the information. In some implementations, the datastore 526 or a portion of the datastore 526 is distributed across one or more user devices 404, the one or more servers, and so forth.

The datastore 526 can store the location data 330, the map data 332, the target destination data 334, the language data 336, the update data 338 and the audio data 410, 420, 430 as described in FIGS. 3 and 4.

Figure 6:
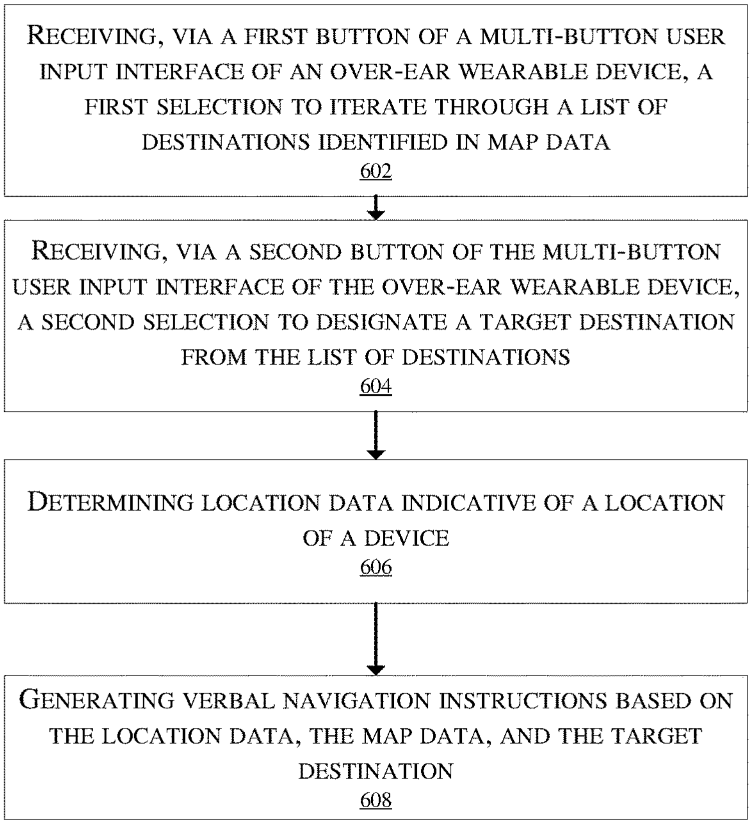
FIG. 6 is a diagram that illustrates a flow chart of an example of using the method for using an over-ear wearable device.

FIG. 6 is a diagram that illustrates a flow chart of an example of a method 600 for using an over-ear wearable device. The method 600 can be performed using the over-ear wearable device 102 as described in FIGS. 1-3.

The method 600 includes, at block 602, receiving, via a first button of a multi-button user input interface of an over-ear wearable device, a first selection to iterate through a list of destinations identified in map data. For example, the user can select the second button 114, which causes the over-ear wearable device 102 to iterate through the list of destinations. The list of destinations can include check in counter, security check, airport lounge, nearest washroom, and the like.

The method 600 can also include, at block 604, receiving, via a second button of the multi-button user input interface of the over-ear wearable device, a second selection to designate a target destination from the list of destinations. For example, the user can select the third button 116 to pick the airport lounge as the target destination.

The method 600 can include, at block 606, determining location data indicative of a location of a device. For example, the over-ear wearable device 102 includes a built-in navigation system, such as a GPS navigation system and compass, so that the over-ear wearable device 102 can determine its location and which direction the user is facing and/or moving.

The method 600 may also include, at block 608, generating verbal navigation instructions based on the location data, the map data, and the target destination. For example, the verbal navigation instructions can include verbal instructions such as walk forward, turn left, turn right, stop, and so forth. The verbal navigation instructions can also include a distance to the next waypoint or other navigation milestone. For example, the verbal navigation instructions can indicate that the user has to walk forward 20 feet and then turn left. The verbal navigation instructions can also include distance updates while the user is moving. Continuing the above example, the verbal navigation instructions can indicate that the user has 15 feet, 10 feet, 5 feet, and so forth remaining before reaching the next waypoint or navigation milestone (e.g., until a turn or until reaching their target destination). In another example, the verbal navigation instructions can indicate that the user has to walk 30 steps and then turn left. The verbal navigation instructions can also include a number of steps update while the user is moving. Continuing the above example, the verbal navigation instructions can indicate that the user has 20 steps, 15 steps, 10 steps, and so forth remaining before reaching the next waypoint or navigation milestone (e.g., until a turn or until reaching their target destination).

In some implementations, the verbal navigation instructions include notifications of other destinations they are passing while traversing to their target destination. For example, the verbal navigation instructions can indicate that the user is passing a particular store or washroom while traversing to the airport lounge. In other implementations, the verbal navigation instructions include correction instructions when the over-ear wearable device 102 has determined that the user is off course, lost, or going in the wrong direction. For example, the correction instructions can indicate to the user that they went too far and missed their turn. The correction instructions can then provide instructions to get the user back in the correct direction. For example, the correction instructions may indicate for the user to turn around (180 degrees) and walk 5 feet.

Figure 7:
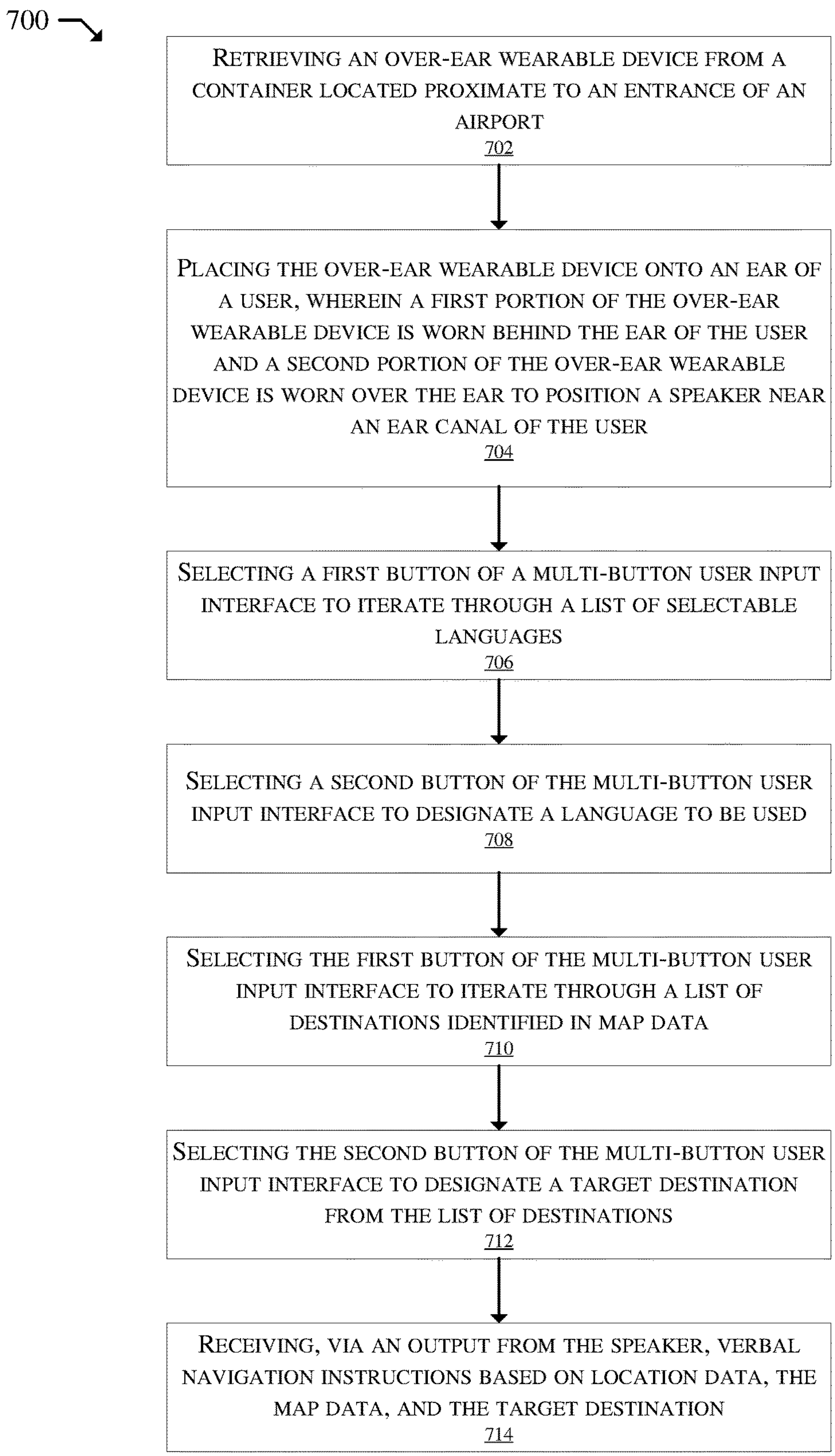
FIG. 7 is a diagram that illustrates a flow chart of another example of using the method for using an over-ear wearable device.

FIG. 7 is a diagram that illustrates a flow chart of an example of a method 700 for using an over-ear wearable device. The method 700 may be performed using the over-ear wearable device 102 as described in FIGS. 1-3.

The method 700 includes, at block 702, retrieving an over-ear wearable device from a container located proximate to an entrance of an airport. For example, when the user arrives at the airport, the user can retrieve the over-ear wearable device from container located proximate to the entrance of the airport. In this example, the container can include one or more over-ear wearable devices that are available for use. To illustrate, an employee can be tasked with the responsibility of placing the over-ear wearable device into the container for storage. Each of the over-ear wearable devices may be cleaned after each use. The cleaning method can include using a cleaning solution to clean the over-ear wearable device and the removeable cover. Other cleaning methods can include removing the removeable cover and replacing it with a new sterile removeable cover. In addition, when the over-ear wearable device has been previously used, the employee removes, and prior data stored on the over-ear wearable device. For example, the employee removes previous verbal navigation instructions, language selections, target destinations, and so forth. The removal of the prior data could include resetting the over-ear wearable device or deleting the data. The employee then ensures that the device is charged either by a wireless or wired charging method as described in FIGS. 1 and 3. Once the over-ear wearable device is in a suitable condition to be used again, the employee places the device in the container which is an ultraviolet container.

The method 700 includes, at block 704, placing the over-ear wearable device onto an ear of a user, wherein a first portion of the over-ear wearable device is worn behind the ear of the user and a second portion of the over-ear wearable device is worn over the ear to position a speaker near an ear canal of the user.

The method 700 also includes, at block 706, selecting a first button of a multi-button user input interface to iterate through a list of selectable languages. For example, the user may select the second button 114 to iterate through the list of languages.

The method 700 also includes, at block 708, selecting a second button of the multi-button user input interface to designate a language to be used. For example, the user may hear that English language is an option. Upon hearing that option, the user may select the third button 116 to select English as the preferred language.

The method 700 includes, at block 710, selecting the first button of the multi-button user input interface to iterate through a list of destinations identified in map data. For example, the user may select the second button 114 to iterate through the list of destinations. The list of destinations may include check in counter, security check, airport lounge, nearest washroom, and the like.

The method 700 includes, at block 712, selecting the second button of the multi-button user input interface to designate a target destination from the list of destinations. For example, the user may select the third button 116 to pick the airport lounge as the target destination.

The method 700 also includes, at block 714, receiving via an output from the speaker, verbal navigation instructions based on location data, the map data, and the target destination. For example, the user may hear instructions to walk forward 20 feet before turning right.

Particular aspects of the disclosure are described below in sets of interrelated Examples:

According to Example 1, an over-ear wearable device includes a housing including a first portion configured to be worn behind an ear of a user and a second portion configured to extend over the ear to position an output near an ear canal of the user; a memory disposed within the housing, wherein the memory stores map data for an airport; one or more navigation sensors disposed within the housing, wherein the one or more navigation sensors are configured to generate location data based on global positioning system signals, local positioning system signals, or a combination thereof; a multi-button user input interface coupled to the first portion of the housing; and one or more processors disposed within the housing, wherein the one or more processors are coupled to the memory and the one or more navigation sensors, and wherein the one or more processors are configured to, responsive to selection of a first button of the multi-button user input interface, iterate through a list of destinations identified in the map data; responsive to selection of a second button of the multi-button user input interface, designate a target destination from the list of destinations; and generate verbal navigation instructions based on the location data, the map data, and the target destination.

Example 2 includes the over-ear wearable device of Example 1, wherein the one or more processors are further configured to, responsive to selection of a third button of the multi-button user input interface, adjust a volume level of an output of the verbal navigation instructions.

Example 3 includes the over-ear wearable device of Example 1 or Example 2 and further includes a first tactile indicia associated with the first button, wherein the first tactile indicia is located proximate to the first button; and a second tactile indicia associated with the second button, wherein the second tactile indicia is located proximate to the second button.

Example 4 includes the over-ear wearable device of any of Examples 1 to 3, wherein the one or more processors are further configured to, responsive to selection of the first button of the multi-button user input interface, iterate through a list of languages, wherein the selection of the first button to iterate through the list of languages occurs before the selection of the first button to iterate through the list of destinations; and responsive to selection of the second button of the multi-button user input interface, designate a language to be used for the iterating through the list of destinations identified in the map data, the verbal navigation instructions, or both.

Example 5 includes the over-ear wearable device of any of Example 1 to Example 4 and further includes a speaker located within the output near the ear canal of the user, wherein the speaker is configured to provide a verbal output associated with the iteration through the list of destinations identified in the map data, the verbal navigation instructions, or both.

Example 6 includes the over-ear wearable device of any of Example 1 to 5 and further includes a network interface configured to enable communications between the over-ear wearable device and other network accessible devices; and wherein the one or more processors are further configured to receive, using the network interface, data indicative of one or more of: updated map data for the airport, data indicative of a change to flight information, or data indicative of information associated with the airport.

Example 7 includes the over-ear wearable device of Example 6, wherein the one or more processors are further configured to, responsive to the received data, generate verbal instructions indicative of an update to the map data for the airport, a change to the flight information associated with the user, or the information associated with the airport; provide, using the output near the ear canal of the user, the verbal instructions; and responsive to the selection of the second button, resume the verbal navigation instructions.

Example 8 includes the over-ear wearable device of Example 6 or Example 7, wherein the one or more processors are further configured to, responsive to the received data, generate verbal instructions indicative of an update to the map for the airport, a change to the flight information associated with the user, or the information associated with the airport; provide, using the output near the ear canal of the user, the verbal instructions; and responsive to completion of the verbal instructions, resume the verbal navigation instructions.

Example 9 includes the over-ear wearable device of any of Example 6 to 8, wherein the one or more processors are further configured to, responsive to the received data, generate verbal instructions indicative of an update to the map for the airport, a change to the flight information associated with the user, or the information associated with the airport; provide, using the output near the ear canal of the user, the verbal instructions; and responsive to the selection of the second button, generate updated verbal navigation instructions.

Example 10 includes the over-ear wearable device of any of Examples 1 to 9 and further includes a removeable cover configured to encase at least the first portion of the housing, wherein the removeable cover includes at least a first opening to accommodate the second portion.

Example 11 includes the over-ear wearable device of any of Examples 1 to 10, further includes a charging port configured to receive a charging cable to charge the over-ear wearable device.

Example 12 includes the over-ear wearable device of any of Examples 1 to 11, wherein the global positioning system signals are generated by a global positioning system and the local and satellite signals are generated by a differential global positioning system that supplements and enhances the global positioning system signals.

Example 13 includes the over-ear wearable device of any of Examples 1 to 12, wherein the list of destinations comprises one or more of: a gate associated with travel information associated with the user, one or more restaurants located within the airport, one or more smoking locations, one or more washrooms, or one or more stores.

Example 14 includes the over-ear wearable device of any of Examples 1 to 13, wherein the one or more processors are further configured to provide, using the output near the ear canal of the user, the verbal navigation instructions; determine that the device is at the target destination; and responsive to the determination, provide, using the output near the ear canal of the user, instructions that the user has reached the target destination.

Example 15 includes the over-ear wearable device of any of Examples 1 to 14, wherein the one or more processors are further configured to provide, using the output near the ear canal of the user, the verbal navigation instructions; responsive to selection of the first button of the multi-button user input interface, iterate through the list of destinations identified in the map data, wherein the selection of the first button occurs prior to the user reaching the target destination; responsive to selection of the second button of the multi-button user input interface, designate a second target destination from the list of destinations; and generate second verbal navigation instructions based on second location data, the map data, and the second target destination.

According to Example 16, a method includes receiving, via a first button of a multi-button user input interface of an over-ear wearable device, a first selection to iterate through a list of destinations identified in map data; receiving, via a second button of the multi-button user input interface of the over-ear wearable device, a second selection to designate a target destination from the list of destinations; determining location data indicative of a location of a device; and generating verbal navigation instructions based on the location data, the map data, and the target destination.

Example 17 includes the method of Example 16, further includes receiving a third selection of a third button of the multi-button user input interface to adjust a volume level of an output of the verbal navigation instructions.

Example 18 includes the method of Example 16 or Example 17, further includes providing, using a speaker near an ear canal of the user, the verbal navigation instructions; determining that the device is at the target destination; providing, using the speaker near the ear canal of the user, instructions that the user has reached the target destination.

Example 19 includes the method of any of Example 16 to 18, further includes receiving, prior to the first selection of the first button, a third selection of the first button of the multi-button user input interface to iterate through a list of languages; and response to a fourth selection of the second button, designating a language to be used for the iterating through the list of destinations identified in the map data, the verbal navigation instructions or both.

According to Example 20, a method includes retrieving an over-ear wearable device from a container located proximate to an entrance of an airport; placing the over-ear wearable device onto an ear of a user, wherein a first portion of the over-ear wearable device is worn behind the ear of the user and a second portion of the over-ear wearable device is worn over the ear to position a speaker near an ear canal of the user; selecting a first button of a multi-button user input interface to iterate through a list of selectable languages; selecting a second button of the multi-button user input interface to designate a language to be used; selecting the first button of the multi-button user input interface to iterate through a list of destinations identified in map data; selecting the second button of the multi-button user input interface to designate a target destination from the list of destinations; and receiving, via an output from the speaker, verbal navigation instructions based on location data, the map data, and the target destination.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An over-ear wearable device comprising:

a housing including a first portion configured to be worn behind an ear of a user and a second portion configured to extend over the ear to position an output near an ear canal of the user;

a memory disposed within the housing, wherein the memory stores map data for an airport;

one or more navigation sensors disposed within the housing, wherein the one or more navigation sensors are configured to generate location data based on global positioning system signals, local positioning system signals, or a combination thereof;

a multi-button user input interface coupled to the first portion of the housing; and one or more processors disposed within the housing, wherein the one or more processors are coupled to the memory and the one or more navigation sensors, and wherein the one or more processors are configured to:

responsive to selection of a first button of the multi-button user input interface, iterate through a list of destinations identified in the map data;

responsive to selection of a second button of the multi-button user input interface, designate a target destination from the list of destinations; and generate verbal navigation instructions based on the location data, the map data, and the target destination.

2. The over-ear wearable device of claim 1, wherein the one or more processors are further configured to:

responsive to selection of a third button of the multi-button user input interface, adjust a volume level of an output of the verbal navigation instructions.

3. The over-ear wearable device of claim 1, further comprising:
a first tactile indicia associated with the first button, wherein the first tactile indicia is located proximate to the first button; and
a second tactile indicia associated with the second button, wherein the second tactile indicia is located proximate to the second button.

4. The over-ear wearable device of claim 1, wherein the one or more processors are further configured to:
responsive to selection of the first button of the multi-button user input interface, iterate through a list of languages, wherein the selection of the first button to iterate through the list of languages occurs before the selection of the first button to iterate through the list of destinations; and
responsive to selection of the second button of the multi-button user input interface, designate a language to be used for the iterating through the list of destinations identified in the map data, the verbal navigation instructions, or both.

5. The over-ear wearable device of claim 1, further comprising:
a speaker located within the output near the ear canal of the user, wherein the speaker is configured to provide a verbal output associated with the iteration through the list of destinations identified in the map data, the verbal navigation instructions, or both.

6. The over-ear wearable device of claim 1, further comprising:
a network interface configured to enable communications between the over-ear wearable device and other network accessible devices; and
wherein the one or more processors are further configured to:
receive, using the network interface, data indicative of one or more of:
updated map data for the airport,
data indicative of a change to flight information, or
data indicative of information associated with the airport.

7. The over-ear wearable device of claim 6, wherein the one or more processors are further configured to:
responsive to the received data, generate informational announcements indicative of an update to the map data for the airport, a change to the flight information associated with the user, or the information associated with the airport;
provide, using the output near the ear canal of the user, the informational announcements; and
responsive to the selection of the second button, resume the verbal navigation instructions.

8. The over-ear wearable device of claim 6, wherein the one or more processors are further configured to:
responsive to the received data, generate informational announcements indicative of an update to the map for the airport, a change to the flight information associated with the user, or the information associated with the airport;
provide, using the output near the ear canal of the user, the informational announcements; and
responsive to completion of the informational announcements, resume the verbal navigation instructions.

9. The over-ear wearable device of claim 6, wherein the one or more processors are further configured to:
responsive to the received data, generate informational announcements indicative of an update to the map for the airport, a change to the flight information associated with the user, or the information associated with the airport;
provide, using the output near the ear canal of the user, the informational announcements; and
responsive to the selection of the second button, generate updated verbal navigation instructions.

10. The over-ear wearable device of claim 1, further comprising:
a removeable cover configured to encase at least the first portion of the housing, wherein the removeable cover includes at least a first opening to accommodate the second portion.

11. The over-ear wearable device of claim 1, further comprising:
a charging port configured to receive a charging cable to charge the over-ear wearable device.

12. The over-ear wearable device of claim 1, wherein the global positioning system signals are generated by a global positioning system and the local and satellite signals are generated by a differential global positioning system that supplements and enhances the global positioning system signals.

13. The over-ear wearable device of claim 1, wherein the list of destinations comprises one or more of:
a gate associated with travel information associated with the user,
one or more restaurants located within the airport,
one or more smoking locations,
one or more washrooms, or
one or more stores.

14. The over-ear wearable device of claim 1, wherein the one or more processors are further configured to:
provide, using the output near the ear canal of the user, the verbal navigation instructions;
determine that the device is at the target destination; and
responsive to the determination, provide, using the output near the ear canal of the user, instructions that the user has reached the target destination.

15. The over-ear wearable device of claim 1, wherein the one or more processors are further configured to:
provide, using the output near the ear canal of the user, the verbal navigation instructions;
responsive to selection of the first button of the multi-button user input interface, iterate through the list of destinations identified in the map data, wherein the selection of the first button occurs prior to the user reaching the target destination;
responsive to selection of the second button of the multi-button user input interface, designate a second target destination from the list of destinations; and
generate second verbal navigation instructions based on second location data, the map data, and the second target destination.

16. A method comprising:
receiving, via a first button of a multi-button user input interface of an over-ear wearable device, a first selection to iterate through a list of destinations identified in map data;
receiving, via a second button of the multi-button user input interface of the over-ear wearable device, a second selection to designate a target destination from the list of destinations;
determining location data indicative of a location of the over-ear wearable device; and
generating verbal navigation instructions based on the location data, the map data, and the target destination.

17. The method of claim 16, further comprising:

receiving, via a third button of the multi-button user input interface, a third selection to adjust a volume level of an output of the verbal navigation instructions.

18. The method of claim 16, further comprising:

providing, using a speaker near an ear canal of the user, the verbal navigation instructions;

determining that the over-ear wearable device is at the target destination; and providing, using the speaker near the ear canal of the user, instructions that the user has reached the target destination.

19. The method of claim 16, further comprising:

receiving, prior to the first selection of the first button, a third selection of the first button of the multi-button user input interface to iterate through a list of languages; and response to a fourth selection of the second button, designating a language to be used for the iterating through the list of destinations identified in the map data, the verbal navigation instructions, or both.

20. A method comprising:

retrieving an over-ear wearable device from a container located proximate to an entrance of an airport;

placing the over-ear wearable device onto an ear of a user, wherein a first portion of the over-ear wearable device is worn behind the ear of the user and a second portion of the over-ear wearable device is worn over the ear to position a speaker near an ear canal of the user;

selecting a first button of a multi-button user input interface to iterate through a list of selectable languages;

selecting a second button of the multi-button user input interface to designate a language to be used;

selecting the first button of the multi-button user input interface to iterate through a list of destinations identified in map data;

selecting the second button of the multi-button user input interface to designate a target destination from the list of destinations; and receiving, via an output from the speaker, verbal navigation instructions based on location data, the map data, and the target destination.

* * * * *